United States Patent [19]

Höcker et al.

[11] Patent Number: 5,116,918
[45] Date of Patent: May 26, 1992

[54] CROSSLINKED COPOLYMERS BASED ON CYCLIC ESTERS AND CARBONATES

[75] Inventors: Hartwig Höcker; Helmut Keul, both of Aachen; Edgar Leitz, Dormagen; Norbert Schön; Steffen Kühling, both of Krefeld, all of Fed. Rep. of Germany

[73] Assignee: Bayer Aktiengesellschaft, Leverkusen, Fed. Rep. of Germany

[21] Appl. No.: 657,410

[22] Filed: Feb. 19, 1991

[30] Foreign Application Priority Data

Mar. 1, 1990 [DE] Fed. Rep. of Germany ....... 4006401

[51] Int. Cl.$^5$ ....................... C08G 63/91; C08G 63/08
[52] U.S. Cl. ...................................... 525/415; 528/354
[58] Field of Search ................. 528/354, 358, 415, 67, 528/186, 69

[56] References Cited

U.S. PATENT DOCUMENTS

| | | | |
|---|---|---|---|
| 4,900,785 | 2/1990 | Leitz et al. | 525/67 |
| 4,912,168 | 3/1990 | Eichenauer et al. | 525/186 |
| 4,959,410 | 9/1990 | Eichenauer et al. | 525/67 |
| 4,960,822 | 10/1990 | Eichenauer et al. | 525/67 |
| 4,965,300 | 10/1990 | Eichenauer et al. | 525/415 |

Primary Examiner—John Kight, III
Assistant Examiner—Shelley A. Wright
Attorney, Agent, or Firm—Connolly and Hutz

[57] ABSTRACT

Crosslinked copolymers of
A) cyclic aliphatic esters and
B) cyclic aliphatic carbonates
in which part of B contains crosslinking-active side groups,
their production and their use for the production of films.

7 Claims, No Drawings

CROSSLINKED COPOLYMERS BASED ON CYCLIC ESTERS AND CARBONATES

This invention relates to crosslinked copolymers based on cyclic aliphatic esters and cyclic aliphatic carbonates and to a process for their production.

DE-OS 37 00 193 describes sequential copolymers of cyclic aliphatic carbonates and esters. They are suitable, for example, for the production of films which show balanced physical properties (hardness, tensile strength, elongation at break). However, their dimensional stability is only guaranteed at temperatures below 80.C. The copolymers may also be used as additives for ABS polymers (DE-OS 38 08 844) and for polycarbonate/ABS blends (DE-OS 38 08 840) and as polymeric plasticizers for vinyl chloride polymers (DE-OS 38 08 842).

The present invention relates to crosslinked copolymers produced from

A) 5 to 99.5% by weight, based on A+B, preferably 15 to 99% by weight and more preferably 30 to 98% by weight cyclic aliphatic esters and B) 0.5 to 95% by weight, based on A+B, preferably 1 to 85% by weight and more preferably 2 to 70% by weight cyclic carbonates, of which at least part, preferably 0.5 to 50% by weight, more preferably 0.5 to 35% by weight and most preferably 0.5 to 25% by weight, based on A+B, are B1) cyclic aliphatic carbonates containing cross-linking-active side groups.

The cyclic aliphatic carbonates B1 containing crosslinking-active side groups correspond to formula (I) or (II)

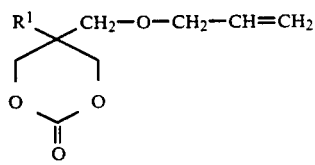
(I)

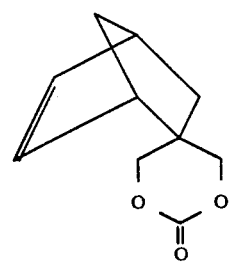
(II)

in which
$R^1$ is H or $C_{1-4}$ alkyl, preferably $C_2H_5$.

In addition, cyclic aliphatic carbonates corresponding to formula (III)

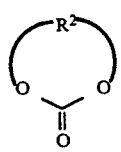
(III)

and/or to formula (IV)

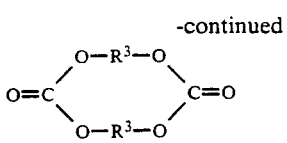
(IV)

may be used for the production of the crosslinked copolymers according to the invention.

$R^2$ is formula (III) represents

—$CH_2CH_2CH(CH_3)$—,  (a)

—$CH_2CH_2OCH_2CH_2OCH_2CH_2$—,  (b)

—$CH_2CH(CH_3)CH_2CH_2C(CH_3)_2CH_2$—,  (c)

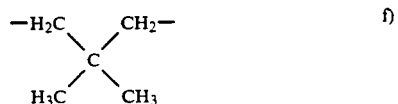
d)

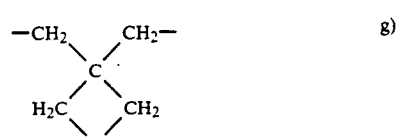
e)

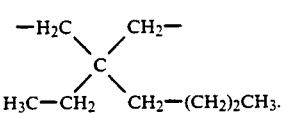
f)

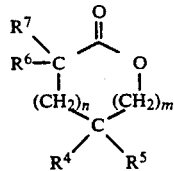
g)

$-H_2C\diagup C \diagdown CH_2-$
$H_3C-CH_2 \quad CH_2-(CH_2)_2CH_3$.

$R^3$ in formula (IV) is a linear $C_{4-12}$ alkylene group or a group corresponding to formula b) or to formula i)

—$CH_2$—$CH_2$—O—$CH_2$—$CH_2$—  (i)

The particularly preferred cyclic aliphatic carbonate corresponding to formula (III) is neopentyl glycol carbonate.

Cyclic aliphatic esters suitable for the production of the crosslinked copolymers according to the invention correspond to formula V $$\begin{array}{c} R^7 \quad O \\ | \quad \| \\ R^6 - C \quad O \\ | \quad | \\ (CH_2)_n \quad (CH_2)_m \\ \diagdown C \diagup \\ R^4 \quad R^5 \end{array}$$
(V)

in which
$R^4$, $R^5$, $R^6$ and $R^7$ may be the same or different and represent H, $C_{1-6}$ alkyl, $C_{3-6}$ alkylene, $C_{1-6}$ alkoxy and $C_{2-6}$-alkenoxy-$C_{1-6}$-alkyl, preferably H, $CH_3$ and $C_2H_5$ and m and n independently of one another assume a value of 0, 1, 2, 3, 4, 5 or 6.

The particularly preferred cyclic aliphatic ester corresponding to formula (V) is ε-caprolactone.

The average molecular weights ($\overline{M}_w$) of the copolymers before crosslinking are in the range from 5,000 to 500,000 g/mol and preferably in the range from 15,000 to 400,000 g/mol.

The present invention also relates to a process for the production of the crosslinked copolymers.

To this end, a mixture of a cyclic aliphatic ester corresponding to formula (V), a cyclic aliphatic carbonate containing a crosslinking-active side group corresponding to formulae (I) and/or (II) and optionally a cyclic aliphatic carbonate corresponding to formulae (III) and/or (IV) is polymerized in an aprotic organic solvent in an inert gas atmosphere (absence of air and moisture) using an organic alkali metal compound as initiator at temperatures in the range from $+50°$ C. to $-100°$ C. and preferably at temperatures of from $+20°$ C. to $-30°$ C., the ratio by weight of monomer to solvent being from 5:100 to 35:100 and preferably from 10:100 to 25:100, and the polymerization-active centers are subsequently deactivated.

Particularly suitable initiators are aryl alkali metal and alkyl alkali metal compounds and also alcoholates of the alkali metals, preferably n-butyl lithium, s-butyl lithium, phenyl lithium, cumyl potassium, naphthalene potassium, naphthalene sodium, potassium tert.-butylate.

n-Butyl and s-butyl lithium are particularly preferred.

Suitable aprotic organic solvents are cyclic ethers, aromatic or aliphatic hydrocarbons and mixtures of cyclic ethers and aromatic or aliphatic hydrocarbons. Preferred solvents are tetrahydrofuran, tetrahydropyran, dioxane, toluene and benzene.

Toluene and tetrahydrofuran are particularly preferred.

After the polymerization reaction, the polymerizationactive centers are deactivated, for example with protic compounds, such as water, alcohols, acids or mixtures thereof. Preferred deactivators are mixtures of methanol and hydrochloric acid and mixtures of methanol and phosphoric acid.

The copolymers may be converted into the crosslinked copolymers according to the invention with radical donors, such as organic and inorganic peroxides, in the melt or in solution at temperatures in the range from $+80°$ C. to $+250°$ C., preferably in the melt at temperatures of $+100°$ C. to $+200°$ C.

Suitable radical donors are peroxides, such as diacyl peroxides (dibenzoyl peroxide, dilauroyl peroxide, didecanoyl peroxide), peroxydicarbonates (dicyclohexyl peroxydicarbonate, di-(4-tert. butyl cyclohexyl)-peroxydicarbonate, dicetyl peroxy-dicarbonate), alkyl peresters (tert. butyl peroxybenzoate, 2,5-dimethyl-2,5-di-(benzoyl peroxy)-hexane, tert. butyl peroxy-(3,5,5-trimethyl hexanoate), tert. butyl monoperoxymaleate, tert. butyl peroxy-2-ethyl hexanoate, tert. butyl peroxyperpivalate, tert. amyl peroxypivalate), perketals (1,1-di-(tert. butylperoxy)-3,3,5-trimethyl cyclohexane, 1,1-di(tert. butylperoxy)-cyclohexane, 2,2-di-(tert. butylperoxy)-butane), dialkyl peroxides (tert. butyl cumyl peroxide, 1,3-di-(tert. butylperoxyisopropyl)-benzene, 2,5-dimethyl-2,5-di-(tert. butylperoxy)-hexane, di-(tert. butyl)-peroxide), alkyl hydroperoxides (cumene hydroperoxide, tert. butyl hydroperoxide, tert. amyl hydroperoxide), inorganic peroxides (ammonium peroxodisulfate, sodium peroxodisulfate, potassium peroxodisulfate).

Particularly suitable peroxides are those having a decomposition half life at 80° C. of $\geq 10$ hours. Examples of peroxides such as these are tert. butylperoxy-(3,5,5-trimethyl hexanoate), tert. butylperoxybenzoate, 1,1-di-(tert. butylperoxy)-cyclohexane, 2,2-di-(tert. butyl-peroxy)-butane, tert. butyl cumyl peroxide, 2,5-dimethyl-2,5-di-(tert. butylperoxy)-hexane, di-(tert. butyl)-peroxide, cumene hydroperoxide and tert. butyl hydroperoxide.

The quantities of radical donors required for crosslinking are between 0.05% by weight and 10% by weight and preferably between 0.2% by weight and 6% by weight, based on (A)+(B).

Crosslinking may also be effected by oxygen as radical donor or by vulcanization of the copolymers with sulfur or sulfur compounds, such as disulfur dichloride, optionally with addition of vulcanization accelerators, such as zinc oxide, 2-mercaptobenzthiazole, tetramethyl thiuram disulfide.

The radical donors may be incorporated in the copolymers by mixing with a solution of the copolymers and subsequent removal of the solvent under moderate conditions (low temperatures, vacuum) or, preferably, by mixing of the copolymers isolated from the solution with the radical donors in standard internal mixers or on rolls at temperatures of up to 60° C.

The copolymers can be recovered in solid form before crosslinking, for example by precipitation with alcohols, filtration and subsequent drying or by direct solvent evaporation e.g. in screw extruders or thin-layer evaporators.

The copolymers are suitable for the production of crosslinked, flexible films combining high elasticity with resistance to ageing by standard methods, such as calendering or thermoforming.

EXAMPLES

Production of the copolymers with crosslinking-active carbonate 15 ml n-butyl lithium solution (2.5 molar in cyclohexane) were added at 15° C. to a solution of neopentyl glycol carbonate (NPC), ε-caprolactone (ECL) and 2-allyloxy methylene-2-ethyl trimethylene carbonate (AETMC) in 6.6 l toluene. A maximum temperature of approximately 25.C was reached during a polymerization time of 90 minutes. The reaction mixture was then deactivated with 50 ml of a mixture of 1-molar phosphoric acid and methanol in a ratio by volume of 1:1 and the copolymer was isolated by precipitation in 10 l methanol, filtration and drying at 30° C. in a vacuum drying cabinet.

The quantities of monomers used, the product yields and the relative viscosities ($\eta_{rel}$) (2% by weight solution in $CH_2Cl_2$, 20° C.) of the copolymers are shown in Table 1.

TABLE 1

| Example | | A | B | C |
|---|---|---|---|---|
| NPC | (g) | 475 | 450 | 400 |
| ECL | (g) | 475 | 450 | 400 |
| AETMC | (g) | 50 | 100 | 200 |
| Yield | (g) | 990 | 920 | 900 |
| $\eta_{rel}$ | | 2.35 | 2.30 | 2.0 |

Production of a copolymer without crosslinking-active carbonate

Comparison Example D 10 ml n-butyl lithium solution (2.5 molar in cyclohexane) were added at 15° C. to a solution of 900 g neopentyl glycol carbonate (NPC) and 900 g ε-caprolactone (ECL) in 10 l toluene. A maximum temperature of approximately 24° C. was reached during a polymerization time of 60 minutes. The reaction mixture was then deactivated with 100 ml of a mixture of 1-molar phosphoric acid and methanol in a ratio by volume of 1:1 and the copolymer was isolated by precipitation in 20 l methanol, filtration and drying at 50° C. in a vacuum drying cabinet. Yield: 1,740 g, $\eta_{rel}$: 6.1

Crosslinking of the copolymers 2,5-dimethyl-2,5-di-(tert. butylperoxy)-hexane was incorporated in the copolymers on a roller at 30° to 40° C. Crosslinking was carried out in a press at 160° C./200 bar, press-molded plates measuring 100×100×2 mm being produced. The press-molding time was 25 minutes.

Determination of the glass temperature

The glass temperature of the crosslinked copolymers was determined with a differential calorimeter (Perkin Elmer DSC 7). Each sample was heated twice from −80 to +200° C. under nitrogen at a heating rate of 20° C./minute. After the first heating, the sample in the calorimeter was cooled to −80° C. at 40° C./minute. The glass temperature was measured during the second heating.

Determination of solubility 30 ml $CH_2Cl_2$ was added to quantities of 1 g of the crosslinked copolymers. After 72 h, the insoluble fractions were filtered off, the solution was concentrated and the soluble fractions were quantitatively determined by weighing out the residue.

Mechanical-dynamic analysis

A Rheometric dynamic spectrometer (Rheometric RDS 7700) was used for determining the storage moduli G', glass and melting temperatures by shear modulus measurement (measuring frequency 1 Hz). The measurements were carried out on S2 test specimens obtained from the press-molded plates.

Thermomechanical analysis

The thermomechanical analyses were carried out with a Perkin Elmer TMS 1. Each test specimen (press-molded plate, thickness 2 mm) was heated from −100° C. to +350° C. at a heating rate of 5° C./minute under a compressive load of 0.2 N in an inert gas atmosphere of nitrogen. The dimensional stability of the materials was determined via the relative thickness ($d/d_o$) of the test specimens as a function of the measuring temperature.

The glass temperatures $T_g$, the melting temperatures $T_m$, the solubility and the results of the mechanical-dynamic and thermomechanical analyses are shown in Tables 2 and 3.

TABLE 2

| | Peroxide content (parts by weight) | Solubility (%) | $T_g$ (°C.) | $T_m$ (°C.) |
|---|---|---|---|---|
| Examples | | | | |
| A-2 | 1 | <2 | −36 | — |
| A-3 | 3 | <2 | −36* | — |
| A-4 | 6 | <2 | −29 | — |
| B-2 | 1 | 8 | −28 | — |
| B-3 | 3 | <2 | −30* | — |
| B-4 | 6 | <2 | −28 | — |
| C-2 | 1 | 4 | −21 | — |
| C-3 | 3 | <2 | −23* | — |
| C-4 | 6 | <2 | −20 | — |
| Comparison Examples | | | | |
| A-1 | 0 | 56 | −40 | — |
| B-1 | 0 | 32 | −34 | — |
| C-1 | 0 | 21 | −33 | — |
| D-1 | 0 | 87 | −37 | — |
| D-2 | 1 | 30 | −40 | 36 |
| D-3 | 3 | 14 | −37* | 35* |
| D-4 | 6 | 5 | −39 | 35* |

*$T_g$ and $T_m$ determined by the DSC method.

TABLE 3

| | G' (+20° C.)/ G' (−150° C.) (× 10⁻⁴) | $d/d_o$ (at 100° C.) | $d/d_o$ (at 250° C.) |
|---|---|---|---|
| Example | | | |
| A-2 | 6.7 | 1.0 | 1.04 |
| A-4 | 9.3 | 1.0 | 1.04 |
| B-2 | 11.0 | 1.0 | 1.04 |
| B-4 | 13.0 | 1.0 | 1.03 |
| C-2 | 16.7 | 1.0 | 1.02 |
| C-4 | 16.3 | 1.0 | 1.02 |
| Comparison Example | | | |
| A-1 | 4.0 | 0.1 | 0.07 |
| B-1 | 7.2 | 0.52 | 0.48 |
| C-1 | 5.4 | 0.65 | 0.66 |
| D-1 | — | 0 | 0 |
| D-2 | — | 0.63 | 0 |

The results of Table 3 show that the crosslinked copolymers according to the invention show distinctly better dimensional stability than the uncrosslinked copolymers.

We claim:

1. Radically crosslinked copolymers produced from
 A) 5 to 99.5% by weight cyclic aliphatic esters and
 B) 0.5 to 95% by weight cyclic aliphatic carbonates, of which at least part are
 B1) cyclic aliphatic carbonates containing crosslinking-active side groups.

2. Crosslinked copolymers according to claim 1 wherein (B1) constitutes 0.5 to 50% by weight of A+B.

3. Crosslinked copolymers as claimed in claim 1 produced from cyclic aliphatic carbonates containing crosslinking-active side groups B1 corresponding to formulae I and/or II

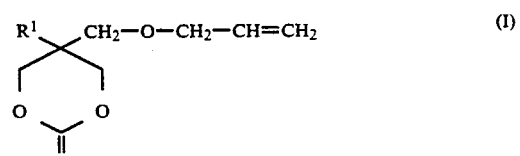

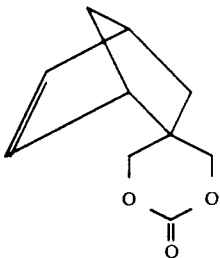
(II)

in which

R$^1$ is H or C$_{1-4}$ alkyl.

4. Crosslinked copolymers as claimed in claim 1, produced from

A) ε-caprolactone,

B) neopentyl glycol carbonate and

B1) the compound corresponding to formula (I) in which R$^1$ is C$_2$H$_5$.

5. Crosslinked copolymers as claimed in claim 1 produced from

A) ε-caprolactone,

B) neopentyl glycol carbonate and

B1) the compound corresponding to formula (II).

6. A process for the production of the crosslinked copolymers claimed in claim 1, characterized in that the cyclic aliphatic esters A) and the cyclic aliphatic carbonates B) are polymerized in an aprotic solvent at temperatures of −100° C. to +50° C., the copolymer is optionally isolated and then crosslinked in the melt at temperatures of +80° C. to +250° C. using radical donors.

7. A process for the production of the crosslinked copolymers as claimed in claim 6, characterized in that organic or inorganic peroxides are used as the radical donors in quantities of 0.05% by weight to 10% by weight, based on A+B.

* * * * *